E. C. James.
Road Locomotive.
Nº 72397      Patented Dec. 17, 1867.
Fig: 1.
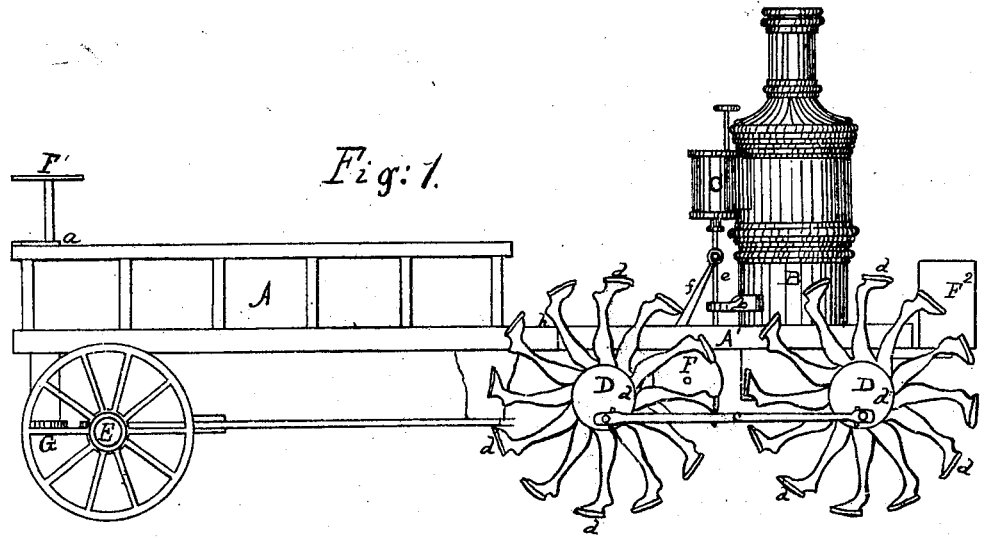
Fig: 2.
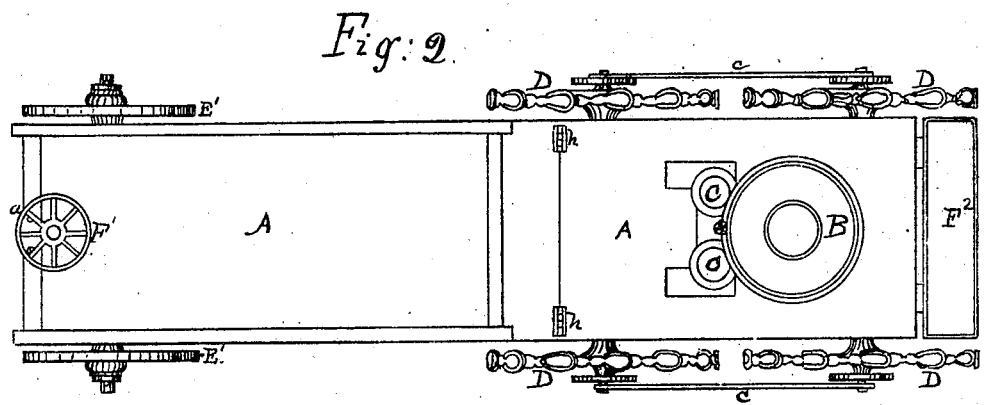
Fig: 3.
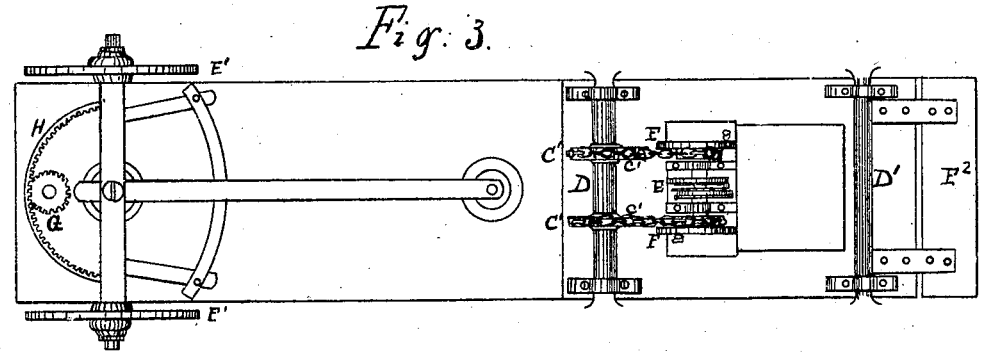
Witnesses
John S. Hollingshead
Jno. D. Patten
Inventor
Edward C. James
pr Holmead & Hollingshead
attys

United States Patent Office.

EDWARD C. JAMES, OF BALTIMORE, MARYLAND.

Letters Patent No. 72,397, dated December 17, 1867.

IMPROVEMENT IN ROAD-LOCOMOTIVES.

*The Schedule referred to in these Letters Patent and making part of the same.*

TO ALL WHOM IT MAY CONCERN:

Be it known that I, EDWARD C. JAMES, of Baltimore city, in the county of Baltimore, and State of Maryland, have invented certain new and useful Improvements in Common Road-Locomotives; and I do hereby declare that the following is a full, clear, and exact description of the same, reference being had to the annexed drawings, and to the letters of reference marked thereon, making part of this specification, in which—

Figure 1 is a side elevation.

Figure 2 is a top view.

Figure 3 is a bottom view.

My invention consists in applying to a common road-wagon, of any usual construction, a car operated by steam-cylinders, or by any other motive-power for driving wheels, which wheels, instead of being made with a rim or tire, are to have their spokes, running from the hub to their extremities, sufficiently strong to prevent breaking, and to act directly upon the ground, as the hoofs or shoes of horses or other draught-animals, and thereby to create such similar action by close contact, and produce sufficient friction between the spokes or arms and the surface of the road, to enable the apparatus to be propelled up any ordinary inclined plane.

The difficulties which have heretofore existed in friction-engines or common road-locomotives, grow out of the want of sufficient contact between the drivers and the road, which cannot be obtained by a rim or tire, nor by the cogged wheels which have been heretofore tried, but by the use of my invention this contact is secured, and will prove effectual in producing the proper effect.

In the drawings, A is the body of the wagon; $A^1$, the steam-car; B, the boiler; C, cylinders; C', cog-wheels for endless chain from eccentric-shaft; D, main driving-wheels; D', main shaft of the driving-wheels; E, cams and eccentrics of the engine; E', fore wheels of the wagon; F, crank-wheels of the engine; $F^1$, guide-wheel; $F^2$, water-tank; G, gear-wheel, operating on H, the rack-wheel, for turning fore wheels and to guide the wagon; $a$, straps supporting guide-wheel shaft; $b$, braces supporting piston-rod attached to the boiler; $c$, connecting-rod or equivalent endless chain; $c'$, inside endless chain from $c'$ to eccentric-shaft; $d$, the spokes or arms of driving-wheels; $d'$, the cog-wheels for the chains or crank-wheels of drivers for the connecting-rod $c$, if used; $e$, piston-rods of cylinders; $f$, connecting-rod or pitman; $h$, hinges by which the fore-wagon is connected to the steam-car, and to allow a free motion between them over irregular surfaces.

The main driving-wheels D, which are worked by the endless chain $c'$ $c'$ from cog-wheels on the eccentric-shaft, may be connected to the rear wheels, either by an endless chain working over the cogged wheels $d'$ $d'$, or by a regular connection-bar, $c$, so as to give a double effect upon the road-surface, or, in the event of any irregularities of surface, thus working together, a sufficient amount of contact can, at all times and on very irregular ground, be obtained to cause the proper propulsion of the carriage.

Having thus fully described my invention, what I claim as new, and desire to secure by Letters Patent, is—

The combination of the open wheels with a road-wagon, to be driven by steam, or other equivalent motive-power, when operating substantially as required.

In testimony whereof, I have signed my name to this specification in the presence of two subscribing witnesses.

E. C. JAMES.

Witnesses:
JOHN D. BLOOR,
JOHN S. HOLLINGSHEAD.